United States Patent
Long et al.

(10) Patent No.: US 12,509,712 B2
(45) Date of Patent: Dec. 30, 2025

(54) **SILK GLAND RECOMBINANT EXPRESSION VECTOR OF SILKWORM (*BOMBYX MORI*) EXPRESSING HUMAN EPIDERMAL GROWTH FACTOR, PREPARATION METHOD AND USE THEREOF**

(71) Applicant: SOUTHWEST UNIVERSITY, Chongqing (CN)

(72) Inventors: Dingpei Long, Chongqing (CN); Xian Cheng, Chongqing (CN); Jianfeng Sun, Chongqing (CN); Yanping Liu, Chongqing (CN); Fangyin Dai, Chongqing (CN); Zhonghuai Xiang, Chongqing (CN)

(73) Assignee: SOUTHWEST UNIVERSITY, Chongqing (CN)

( * ) Notice: Subject to any disclaimer, the term of this patent is extended or adjusted under 35 U.S.C. 154(b) by 364 days.

(21) Appl. No.: 18/280,067

(22) PCT Filed: Feb. 23, 2022

(86) PCT No.: PCT/CN2022/077460
§ 371 (c)(1),
(2) Date: Sep. 1, 2023

(87) PCT Pub. No.: WO2022/183952
PCT Pub. Date: Sep. 9, 2022

(65) Prior Publication Data
US 2025/0305020 A1    Oct. 2, 2025

(30) Foreign Application Priority Data
Mar. 4, 2021    (CN) .......................... 202110241205.9

(51) Int. Cl.
| C12N 15/66 | (2006.01) |
| C07K 14/435 | (2006.01) |
| C07K 14/485 | (2006.01) |
| C12N 15/62 | (2006.01) |
| C12N 15/85 | (2006.01) |
| C12P 21/02 | (2006.01) |

(52) U.S. Cl.
CPC ........ *C12P 21/02* (2013.01); *C07K 14/43586* (2013.01); *C07K 14/485* (2013.01); *C12N 15/8509* (2013.01); *C12N 2015/8518* (2013.01); *C12N 2800/105* (2013.01); *C12N 2800/22* (2013.01); *C12N 2830/008* (2013.01)

(58) Field of Classification Search
CPC .... C12N 15/66; C12N 15/62; C12N 15/8509; C12N 2015/8515; C07K 14/43586; C07K 14/485
See application file for complete search history.

(56) References Cited

FOREIGN PATENT DOCUMENTS

| CN | 1405310 A | 10/2004 |
| CN | 101195834 B | 6/2010 |
| CN | 104513821 B | 6/2017 |
| CN | 107254481 A | 10/2017 |
| CN | 108384788 A | 8/2018 |
| CN | 108642059 B | 7/2020 |
| CN | 108486123 B | 10/2020 |
| CN | 111793644 A | 10/2020 |
| CN | 112852876 B | 11/2022 |
| WO | WO9517515 | 6/1995 |

OTHER PUBLICATIONS

Wei-Jian, et al. "Creation and research of voval silk material with hEGF bioactivity," China Academic Journal Electronic Publishing House. 84 pages, May 2015.
Zhou, et al. "Fine Organization of Bombyx mori fibroin heavy chain gene," Nucleic Acids Research, 2000, vol. 28, No. 12. 7 pages.

*Primary Examiner* — Maryam Monshipouri
(74) *Attorney, Agent, or Firm* — Fish IP Law, LLP (57) ABSTRACT

Disclosed is a silk gland recombinant expression vector of silkworm expressing human epidermal growth factor, a preparation method and use thereof. The recombinant expression vector is formed by fusing truncated silk fibroin light chain N-terminal domain, C-terminal domain, optimized human epidermal growth factor and silkworm nuclear polyhedrosis virus enhancer, and removes the redundant part of the extra domain of endogenous silk protein contained in the fusion protein to the maximum extent.

12 Claims, 7 Drawing Sheets
Specification includes a Sequence Listing.

SILK GLAND RECOMBINANT EXPRESSION VECTOR OF SILKWORM (*BOMBYX MORI*) EXPRESSING HUMAN EPIDERMAL GROWTH FACTOR, PREPARATION METHOD AND USE THEREOF

This application is nationalized from International Patent Application No. PCT/CN2022/077460, filed Feb. 23, 2022, which claims priority to Chinese Patent Application No. 202110241205.9, filed Mar. 4, 2021. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

TECHNICAL FIELD

The present disclosure belongs to the technical field of biological materials, in particular to a silk gland recombinant expression vector of silkworm (*Bombyx mori*) expressing human epidermal growth factor, a preparation method and use thereof.

BACKGROUND

Silk, also known as cocoon silk, is a continuous long fiber formed by the solidification and fibrosis of liquid silk protein secreted by silk glands when the silkworm spins and cocoons. Silk is a porous protein fiber and as a textile material, silk has the advantages of good air permeability, excellent hygroscopicity, etc. In addition, silk has excellent physicochemical properties such as mechanical properties, environmental stability, biocompatibility, and biodegradability, making it emerge gradually in the field of medical and biological tissue engineering research as an ideal biological material. In recent years, silk, as a raw material, has been gradually and widely used in the development and research of biological materials for tissue repair, and has shown good application effects and great potential development prospects in the research and development of new materials such as cell culture carriers, wound dressings, artificial skin and tissue engineering scaffolds. However, with the development of society, the traditional excellent properties of silk can no longer fully meet the needs of medical biological materials. Researchers are eager to obtain new silk biological materials that not only retain the original excellent mechanical properties and biocompatibility of silk, but also have biological activities such as promoting cell growth, proliferation, adhesion, and wound healing.

Using the transgenic silkworm as the bio-hybridization platform, the technology of integrating the exogenous protein(s) of interest (POI) into the silk-based materials through genetic hybridization provides a promising bottom-up method for the design, synthesis and functionalization of these new silk biological materials. At present, a variety of transgenic silkworm silk gland expression systems have been successfully developed by using the silkworm genetic improvement technology based on the piggyBac transposon system, including the silkworm posterior silk gland expression system and silkworm anterior and middle silk gland expression system; the silkworm posterior silk gland expression system includes silk fibroin (SF) heavy chain (SF-h), silk fibroin light chain (SF-l) and Fhx/P25 expression system, which express POI in the inner silk fibroin layer of silk fibers; the silkworm anterior and middle silk gland expression system includes sericin 1 (Ser1) and sericin 3 (Ser3) expression systems, which express POI in the external sericin layer of silk fibers. In fact, in order to obtain a genetically modified silk-based biological material suitable for further extraction and processing, it is necessary to integrate an exogenous POI into the silk fibroin layer of silk fibers by genetic hybridization. At present, only SF-h and SF-l expression systems can realize the integration of exogenous POI into the silk fibroin layer of silk fibers. These two systems are also the most widely used and mature transgenic silkworm silk gland expression systems for synthesizing novel exogenous protein functional silk materials, which have been reported. So far, by means of SF-h and SF-l expression systems, dozens of genetically modified silk-based materials having silk fibroin layers containing different functional POIs (including human type III collagen, human basic fibroblast growth factor, feline interferon, human intravascular epidermal growth factor, and the like) have been created by genetic hybridization.

The exogenous POI synthesized by transgenic silkworm is essentially fusion proteins, i.e., fusion POI (F-POI). The traditional strategy for the synthesis of exogenous POI using transgenic silkworm is usually to introduce additional domains from endogenous SF proteins upstream and/or downstream of the POI structural sequence to form F-POI. In this regard, it is ensured that the F-POI and endogenous SF proteins are synthesized simultaneously and secreted into the cocoon. The above SF-h and SF-l expression systems are expressed by fusing part of the structural sequences of the SF-h protein or the SF-l protein with POI sequences, so as to create an exogenous protein functionalized silk-based material containing F-POI in the silk fibroin layer. However, specific portions of the additional domain of the endogenous fibroin may cause additional posttranslational modifications to F-POI and affect its normal folding. These abnormal modifications will significantly reduce the biological activity of the F-POI, thereby limiting the use of the transgenic silkworm biological hybridization platform in the functionalization of silk-based materials. In fact, the biological activity of F-POI contained in the genetically modified silk materials created by genetic hybridization using the traditional SF-h and SF-l silk fibroin expression systems is often significantly reduced or even completely inactivated compared with the natural POI. This phenomenon has become one of the main bottlenecks that restrict the promotion and development of exogenous protein functionalized silk-based materials. The above genetically modified silk-based materials expressing human type III collagen, human basic fibroblast growth factor, feline interferon or human intravascular epidermal growth factor reported in the literature at present have all shown a significant decrease in biological activity due to the abnormal modification of F-POI.

The natural SF-h protein synthesized and secreted by the posterior silk glands of the silkworm comprises three domains, an N-terminal domain (containing 146 amino acids), a repeat domain and a C-terminal domain (containing 57 amino acids). The amino acid sequence located at positions 1-21 of the N-terminal domain is a signal peptide of the SF-h protein, which is considered necessary to mediate the transport of the SF-h protein from the posterior silk gland cells to the silk gland cavity through the endoplasmic reticulum membrane. The signal peptide sequence will eventually cleave from the mature SF-h protein. The amino acids located at the last 1-20 positions of the C-terminal domain of the SF-h protein contain three cysteine residues (positions 1, 4, and 20), which can form intramolecular or intermolecular disulfide bonds, thus ensuring the correct folding of the SF-h protein and its assembly with other silk proteins to form the silk fibroin secretion unit. In addition, studies have shown that there are some amino acids that may undergo post-translational modifications (including phosphorylation modification or N-glycosylation modification) in the N-terminal and C-terminal domains of the SF-h protein. For bioengineered proteins, the extra post-translational modifications during synthesis may not only result in a huge difference between the actual and theoretical molecular weights of the target protein, but also affect the normal folding and processing of the target protein, thereby significantly reducing the biological activity of the target protein.

The traditional SF-h expression system aims to replace the entire repeat domain of SF-h with the original structural sequence of the natural POI, so as to synthesize the F-POI with full-length sequence, thus retaining and fusing additional domains (i.e., N-terminal and C-terminal domains) from the natural SF-h protein, thereby also retaining the amino acid sites where redundant post-translational modifications may occur. In the early research, the traditional SF-h expression system of silkworm in Chinese Patent (Publication No. CN101195834A) expressed exogenous protein content up to 16% in transgenic silk, which is a transgenic silkworm silk gland expression system reported with the highest efficiency of F-POI expression at present. However, it is found that the actual molecular weight of different types of F-POI created by the traditional SF-h expression system is significantly higher than the theoretical molecular weight due to the influence of redundant post-translational modifications. Moreover, compared with the natural POI, the biological activity of the F-POI is significantly reduced or even completely inactivated, which seriously affects the use and promotion of the bioactive protein functional silk material based on genetic improvement.

SUMMARY

In view of this, a first objective of the present disclosure is to provide a silk gland recombinant expression vector of silkworm (Bombyx mori) expressing human epidermal growth factor; a second objective of the present disclosure is to provide a method for preparing the silk gland recombinant expression vector of silkworm; a third objective of the present disclosure is to provide an exogenous fibroin; and a fourth objective of the present disclosure is to provide use of the exogenous fibroin in the preparation of a biological material based on silk fibroin.

In order to achieve the objectives, the present disclosure provides the following technical scheme.

1. The present disclosure provides a silk gland recombinant expression vector of silkworm (Bombyx mori) expressing human epidermal growth factor, wherein the expression vector comprises a vector skeleton and a target gene expression frame, and the target gene expression frame comprises an optimized human epidermal growth factor (EGF) gene sequence and a silkworm nuclear polyhedrosis virus enhancer sequence (hr3), with the nucleotide sequences set forth in SEQ ID NO:3 and SEQ ID NO:1, respectively.

In some embodiments, the target gene expression frame further comprises a sequence-optimized truncated promoter sequence (FHP3$_s$) encoding amino acids at positions 1-21 of the N-terminal domain of the SF-h protein, wherein the nucleotide sequence of FHP3$_s$ is set forth in SEQ ID NO:2.

In some embodiments, the target gene expression frame further comprises a truncated SF-h gene light chain binding site sequence (LBS$_s$) encoding amino acids at positions 1-20 of the C-terminal domain of SF-h protein, wherein the nucleotide sequence of LBS$_s$ is set forth in SEQ ID NO:5.

In some embodiments, the vector skeleton is pBac{3×P3-DsRed}.

2. The present disclosure further provides a method for preparing the recombinant expression vector, wherein the method comprises the following steps: sequentially connecting hr3, FHP3$_s$, EGF and LBS$_s$, to a pUC57-T-simple vector to obtain a recombinant vector PUC-hr3-FHP3$_s$-EGF-LBS$_s$ containing an hr3-FHP3$_s$-EGF-LBS$_s$, expression frame; double-enzyme-cleaving the recombinant vector with AscI/FseI, recovering an hr3-FHP3$_s$-EGF-LBS$_s$ expression frame fragment, and connecting the fragment to a pBac{3×P3-DsRed} vector skeleton double-enzyme-cleaved by AscI/FseI to obtain a recombinant expression vector of silkworm silk gland pBac{3×P3-DsRed; FHP3-EGF-LBS}.

3. The present disclosure further provides an exogenous fibroin, wherein the exogenous fibroin is expressed by the silkworm silk gland recombinant expression vector.

4. The present disclosure further provides use of the exogenous fibroin in the preparation of a biological material based on silk fibroin.

In some embodiments, the biological material is a transgenic silk fibroin-based injectable hydrogel, a foam scaffold, a silk fibroin film, nanowires and nanospheres.

Beneficial Effects 1) according to the sequence codon preference of the silkworm silk gland expression endogenous gene in the silkworm genome sequence database, the human epidermal growth factor gene sequence is optimally designed, so that the artificially modified EGF gene is more beneficial to the expression in living silkworm individual silk glands;

2) compared with the traditional silkworm silk gland expression system, the technical scheme of the present disclosure utilizes the enhancer hr3 to combine with the optimized truncated silkworm fibroin heavy chain expression system to regulate the specific and high-efficiency expression of the recombinant fusion human epidermal growth factor F-POI (EGF) gene in the posterior silk gland of the silkworm, while it does not affect the transport of the F-POI (EGF) in the silk gland and the genetic hybridization process of the F-POI (EGF) secretion in the silk, and is able to significantly improve the biological activity of the F-POI (EGF) in transgenic silk;

3) the fibroin with the biological activity of the human epidermal growth factor expressed by the silkworm silk gland recombinant expression vector constructed in the present disclosure can be processed into a variety of different types of silk fibroin-based biological materials, and it is confirmed by experiments that F-POI (EGF) released in the transgenic silk fibroin-based material has significant biological activity for promoting cell proliferation, which can even be comparable with a commercially available EGF standard product; it is confirmed by computational 3D structure modeling that the F-POI (EGF) expressed in the functionalized transgenic silk of the present disclosure exhibits high structural similarity to the natural EGF protein, thus also indicating that the transgenic silk obtained by the technical scheme of the present disclosure has extremely high biological activity of the human epidermal growth factor;

4) the technical scheme of the present disclosure can effectively overcome the main technical obstacle that the activity of the recombinant fusion exogenous protein of interest contained in the traditional functionalized silk material obtained based on genetic hybridization means is significantly reduced, and provides a feasible solution for developing a novel high-performance silk-based material by using an advanced biosynthesis platform represented by silkworm.

BRIEF DESCRIPTION OF THE DRAWINGS

FIGS. 1A-B are schematic diagrams of expression frames of two different F-POI (EGF) genes and the corresponding transgenic silkworm recombinant vectors.

FIGS. 2A-D are diagrams showing the identification results of transgenic silkworm and transgenic cocoons expressing different F-POI (EGF) proteins.

FIGS. 4A-D are diagrams showing the results of the identification of the cell growth-promoting activity of the transgenic silk fibroin-based biological material containing the F-POI protein.

FIGS. 5A-B are result diagrams showing the structural similarity between different recombinant fusion human epidermal growth factor proteins expressed in transgenic silk and the natural EGF protein by a de novo prediction 3D modeling method. FIG. 5A: Multi-sequence alignment of amino acids of two F-POI (EGF) proteins, the recombinant EGF protein (TSF-$P_{(s)}$) expressed in transgenic silkworm in the published literature and the natural EGF protein. The amino acids of the N-terminal domain, the EGF sequence and the C-terminal domain are represented by blue, orange and purple backgrounds, respectively. The amino acids at positions 1-21 between the two inverted triangles of the N-terminal domain are the signal peptide sequences of SF-h (in modeling during protein secretion), and the light blue frame (Δ labeled) and purple frame (Δ labeled) contained in the N-terminal domain and the C-terminal domain, respectively, indicate the amino acids predicted to undergo phosphorylation modification. The dark blue box (○ labeled) contained in the N-terminal domain indicates the amino acids predicted to undergo glycosylation modification, and the black frame (☆ labeled) contained in the C-terminal domain indicates the cysteine that will form intramolecular or intermolecular disulfide bonds.

DETAILED DESCRIPTION OF THE EMBODIMENTS

Preferred embodiments of the present disclosure will be described in detail with reference to the accompanying drawings. Experimental methods for which specific conditions are not specified in the examples are usually performed under conventional conditions such as those described in Molecular Cloning A Laboratory Manual (3rd edition, J. Sambrook et al.), or as recommended by the manufacturer. Contents of the sequence identification file designated "Sequence-Listing-ST25.txt", created Oct. 4, 2023 and having a file size of 9.77 KB are incorporated by reference.

The mouse embryonic fibroblast NIH/3T3 cell line (ATCC) used in Examples of the present disclosure was cultured with Dulbecco's Modified Eagle's Medium (DMEM, all from Gibco) containing 10% fetal bovine serum (FBS), 50 mg/mL streptomycin, and 100 mg/mL ampicillin.

Example 1

Construction of the Silk Gland Recombinant Expression Vector of Silkworm (*Bombyx mori*) Expressing Human Epidermal Growth Factor The silkworm silk fibroin heavy chain promoter sequence (FHP3) and the light chain binding site sequence (LBS) in the silkworm SF-h gene (NCBI gene ID: 693030) and the silkworm traditional silk fibroin expression system in the Chinese invention patent (publication NO: CN101195834A), the silkworm nuclear polyhedrosis virus enhancer hr3 sequence (nucleotide sequence of SEQ ID NO:1), the sequence-optimized truncated promoter sequence (FHP3$_s$, nucleotide sequence of SEQ ID NO:2) encoding amino acids at positions 1-21 of the N-terminal domain of SF-h protein, the optimized human epidermal growth factor (EGF) gene (nucleotide sequence of SEQ ID NO:3, amino acid sequence of SEQ ID NO:4, POI (EGF)) and the light chain binding site sequence (LBS$_s$, nucleotide sequence of SEQ ID NO:5) of the truncated SF-h gene encoding amino acids at positions 1-20 of the C-terminal domain of SF-h protein were synthesized by GenScript (Nanjing) Co.Ltd., China.

Figure 1A:
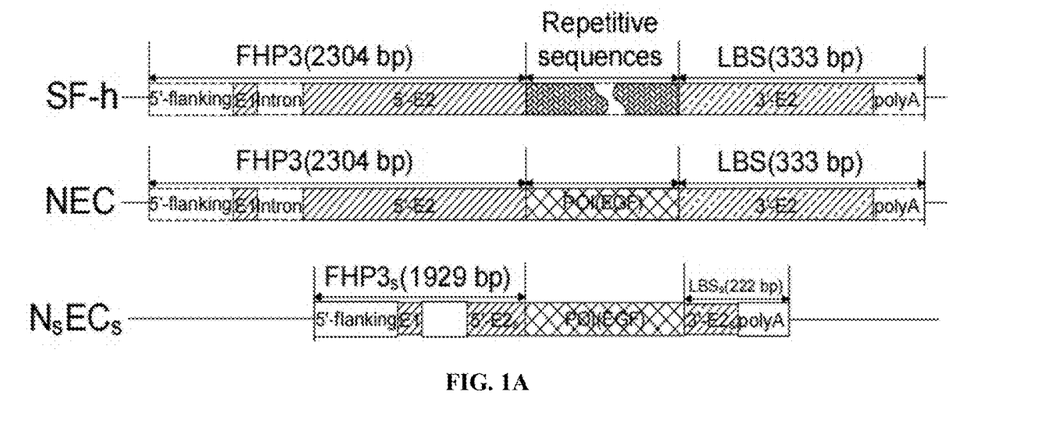
FIG. 1A: Structural diagrams of silkworm fibroin heavy chain gene and expression frames of two different F-POI (EGF) genes.
Figure 1B:
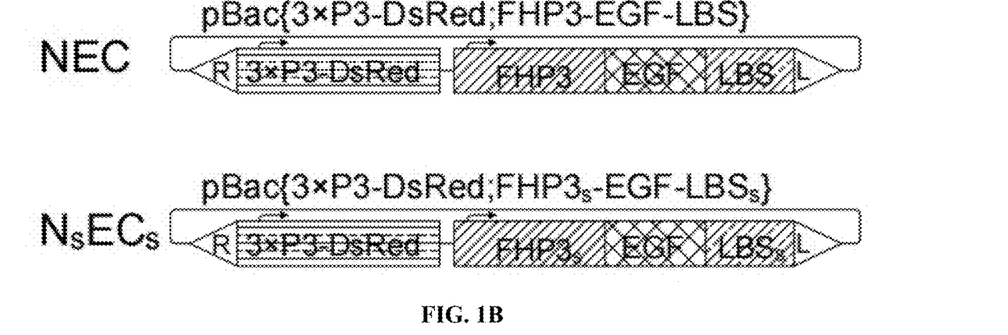
FIG. 1B: Structure diagram of the transgenic silkworm recombinant vector expressing two different F-POI (EGF) proteins.

The above gene sequences were spliced into FHP3-EGF-LBS and HR3-FHP3$_s$-EGF-LBS$_s$ expression frames respectively through seamless connection by the engineer of GenScript (Nanjing) Co.Ltd. Then the expression frames were ligated respectively to region between AscI and FseI restriction sites of the pUC57-T-simple vector to obtain the recombinant vectors pUC-FHP3-EGF-LBS and PUC-hr3-FHP3$_s$-EGF-LBS$_s$. Followed by double enzyme digestion of the recombinant vector by AscI/FseI, the corresponding FHP3-EGF-LBS and hr3-FHP3$_s$-EGF-LBS$_s$, expression frame fragments were respectively recovered, and then the recovered expression frame fragments were connected into the same enzyme-digested pBac{3×P3-DsRed} vector to obtain the transgenic recombinant vector PBAC {3×P3-DsRed; FHP3-EGF-LBS} (hereinafter referred to as NEC), and pBac{3×P3-DsRed; hr3-FHP3$_s$-EGF-LBS$_s$} (hereinafter referred to as N$_s$EC$_s$), as shown in FIG. 1A-FIG. 1B. The two constructed transgenic recombinant vectors both contained a red fluorescent protein (DsRed) gene expression frame initiated by a promoter 3×P3, and the red fluorescent protein specifically expressed in the eyes and nerves of silkworm would be used as a screening marker for positive transgenic silkworm.

Example 2

Preparation of Transgenic Silkworm

With commercial diapause silkworm strain 932 as the original material, the parental silkworm eggs were treated with low temperature induction at 16° C. to terminate diapause of the offspring silkworm eggs. Then the recombinant vector NEC or N$_s$EC$_s$ was mixed with the auxiliary plasmid pHA3PIG in a molar ratio of 1:1, the obtained mixture was injected into G0 generation silkworm eggs that had been terminated from diapause, and the result silkworm eggs were placed in an environment with the relative humidity of 85% at 25° C. for incubation after sealed by non-toxic glue. The hatched G0 generation newly-hatched silkworm was fed with mulberry leaves to moths, the obtained G0 generation silkworm moths were seeded by backcrossing or self-inbring, and G1 generation silkworm eggs were collected. Positive transgenic silkworms with red fluorescence in eyes or the nervous system were screened with Olympus® motorized macroscopic fluorescence microscopy from G1 generation silkworm eggs which were diapause-terminated. And the obtained positive transgenic silkworms were fed to cocoon collection and further self-inbred and selected to obtain the transgenic silkworm strain capable of stably inherit. Table 1 shows the statistics of transgenic vector injection and screening of positive transgenic silkworms.

Figure 2A:
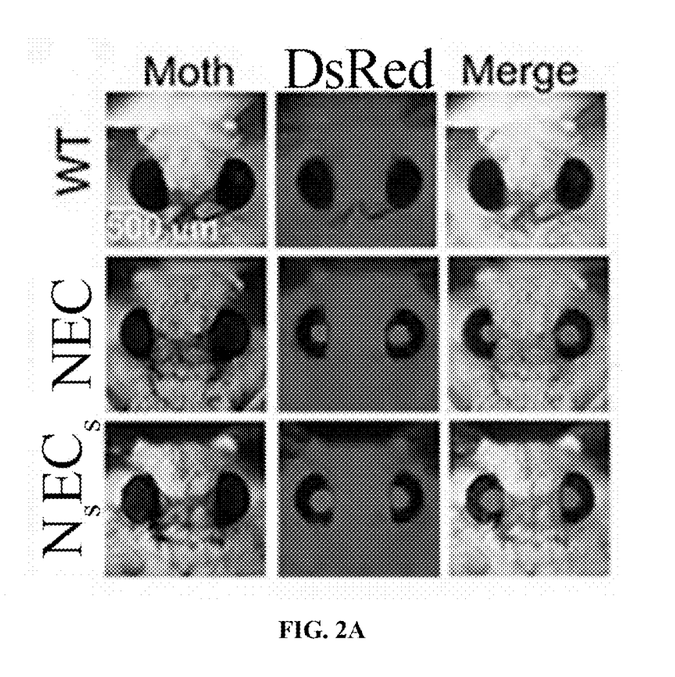
FIG. 2A: Compound eye photos of wild-type silkworm and two transgenic silkworm expressing different F-POI (EGF) proteins.
Figure 2B:
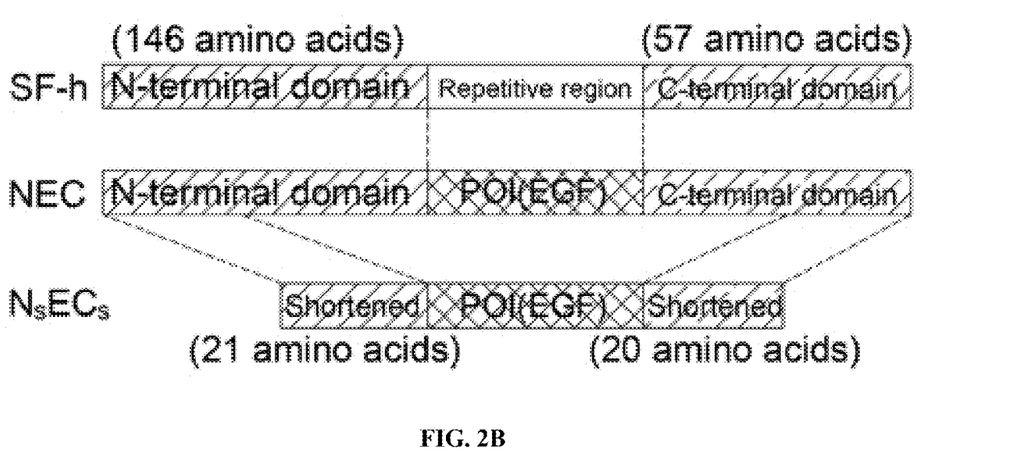
FIG. 2B: Structural diagrams of the fibroin heavy-chain protein and two different F-POI (EGF) proteins.

The results were shown in FIG. 2A, FIG. 2B and Table 1, the red fluorescence caused by DsRed-Express was observed in the eyes of the obtained NEC and N$_s$EC$_s$ silkworm moths (adults), while no fluorescence in the eyes of wild-type (WT) silkworm moths was observed (FIG. 2A), indicating that all the designed transgenic expression frames were successfully inserted into the NEC and N$_s$EC$_s$ silkworm genomes; FIG. 2 B showed the structural schematic diagrams of two F-POI (EGF) proteins expressed in vivo and in the silkworm cocoons of NEC and N$_s$EC$_s$. The F-POI (EGF) protein expressed by NEC contained the complete N-terminal domain and C-terminal domain of SF-h protein, and the F-POI (EGF) protein expressed by N$_s$EC$_s$ contained the optimized N-terminal domain encoding SF-h protein and the optimized C-terminal domain encoding SF-h protein. The results in Table 1 showed that, by fluorescence detection and molecular identification, the obtained genomes contained the transgenic silkworm strains NEC and N$_s$EC$_s$ with the expression frames of FHP3-EGF-LBS and hr3-FHP3$_s$-EGF-LBS$_s$ inserted, respectively.

Example 3

Detection of F-POI (EGF) Protein Expression in Transgenic Cocoon Silk

In order to extract the mixed SF and F-POI (EGF) from the cocoon for further material preparation, the cocoon was cut into pieces and degummed to remove the sericin layer. The specific operation steps of degumming treatment were as follows: NEC and N$_s$EC$_s$ silkworm cocoons expressing two different F-POI (EGF) proteins were randomly selected and cut into 0.5-1 cm pieces, immersed in a mixture of 0.08% (w v$^{-1}$) sodium carbonate and 0.12% (w v$^{-1}$) Marseille soap, degummed for 45 min at 70° C., and rinsed for 3-4 times with ultra-pure water of Milli-Q system (Millipore, Billerica, MA) to remove sericin.

To identify the distribution of two F-POI (EGF) proteins in NEC and N$_s$EC$_s$ silk fibers, a transgenic silk fiber sample for tissue immunofluorescence examination was prepared. The specific operation steps were as follows: The non-degummed or degummed NEC and N$_s$EC$_s$ silk fibers were fixed overnight with 10% (v v$^{-1}$) formalin, the silk fibers were wound into bundles (about 50-100 silk fibers), embedded in Tissue-Tek OCT Tissue Freezing Medium (Sakura Finetek, Torrance, CA, US), and then frozen overnight at 40° C. Subsequently, the frozen embedded samples were cut into 10 μm thick sections, and the sections were immunohistochemical stained with anti-EGF antibodies (ab155576, Abcam, US) as primary antibodies and goat anti-mouse IgG H&L (Alexa-Fluor 594) (ab 150116, Abcam, US) carrying

TABLE 1

Statistics of Transgenic Vector Injection and Screening of Positive Transgenic silkworm

Figure 2C:
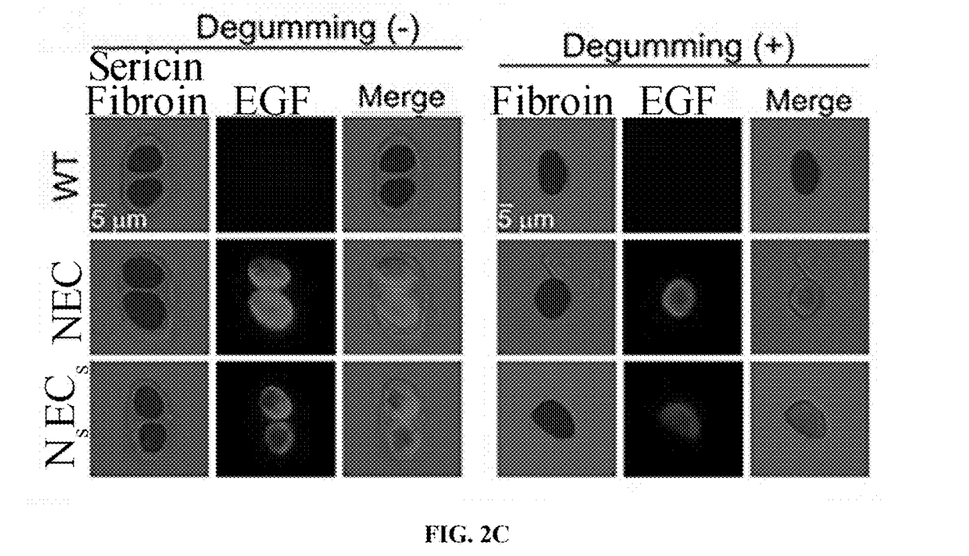
FIG. 2C: Immunofluorescence detection photos of wild-type monofilament sections before and after degumming and transgenic monofilament sections respectively containing two different F-POI (EGF) proteins.

| Injecting plasmids | Injected G0 generation silkworm eggs number | Hatched G0 generation silkworm eggs number (hatching rate, %) | Screened G1 generation moth compartment number | Positive moth compartment number in G1 generation (positive rate, %) | Strain |
|---|---|---|---|---|---|
| pBac{3 × P3-DsRed; FHP3-EGF-LBS} + pHA3PIG | 353 | 153 (43.3%) | 76 | 4 (5.3%) | NEC |
| pBac{3 × P3-DsRed; hr3-FHP3$_s$-EGF-LBS$_s$} + pHA3PIG | 373 | 167 (44.8%) | 84 | 5 (6%) | N$_s$EC$_s$ | fluorescent groups as secondary antibodies, and observed under fluorescence microscopy (BX51RF Olympus, Tokyo, Japan). The results were shown in FIG. 2 C. The red fluorescence signals were observed in the silk fibroin layer of both NEC and $N_sEC_s$ silk fibers before degumming, but no fluorescence signal in the sericin layer was observed. However, relatively strong red fluorescence signals were still retained in the degummed NEC and $N_sEC_s$ silk fibroin. The results showed that the truncated N-terminal and C-terminal domains could also ensure the specific secretion of the F-POI (EGF) protein into the silk fibroin layer of cocoon silk, and maintain the stability of the F-POI (EGF) protein in the silk fibroin layer during the degumming process.

Figure 2D:
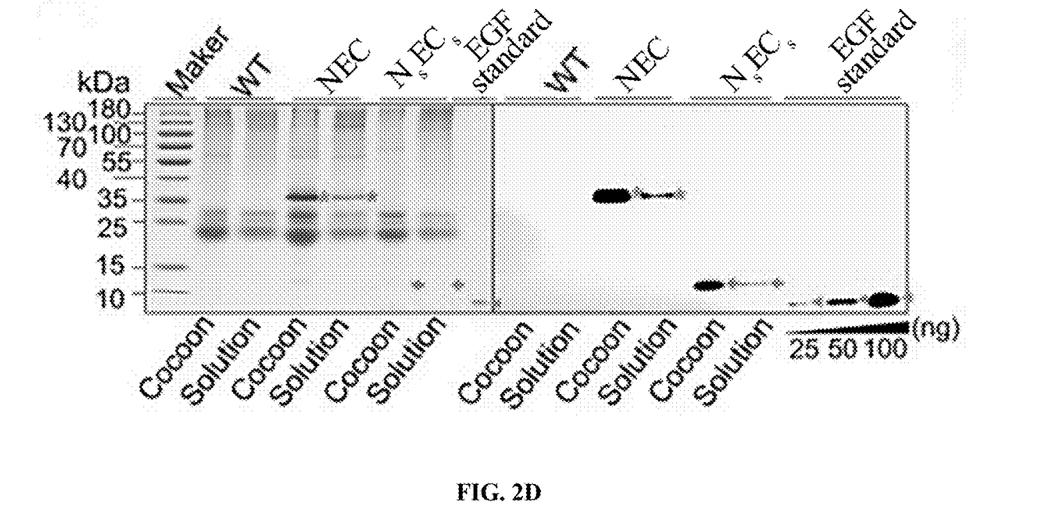
FIG. 2D: SDS-PAGE and Western blot electrophoretogram of the transgenic cocoon silk solution containing two different F-POI (EGF) proteins before and after degumming. Specific F-POI (EGF) proteins with different molecular weights are detected in NEC and $N_sEC_s$ cocoon silk protein samples (indicated by asterisks and triangles, respectively).

The loss rate of the F-POI (EGF) protein caused by the degumming process was evaluated by SDS-PAGE and Western blot detection and calculation of the expression levels of two different F-POI (EGF) proteins in the cocoons of NEC and $N_sEC_s$, respectively. The specific operations were as follows: 30 mg of degummed or non-degummed NEC and $N_sEC_s$ cocoon pieces were respectively weighed and immersed in 500 μL of 9.3M lithium bromide (LiBr) solution and dissolved at 60° C. for 2.5 h. The regenerated solution was dialyzed by using dialysis membrane (MWCO 3500, Pierce) to remove salts. The concentration of cocoon silk protein solution after dialysis was detected by dicyandiamide (BCA) protein detection kit (Beyotine Biotech). 2% (v v$^{-1}$) of β-galactosidase (2-ME) was added into the protein sample and boiled for 5 min, followed by SDS-PAGE (15%, Bio-Rad) gel for electrophoretic separation. The commercially available EGF standard (AF-100-15, PeproTech, US) was used as the positive control and wild-type (WT, common cocoon) degummed cocoon silk was used as the negative control. The SDS-PAGE gel after electrophoresis was stained with 0.1% (v v$^{-1}$) Coomassie brilliant blue R-250, 10% (v v$^{-1}$) acetic acid, and 50% (v v$^{-1}$) methanol. Western blotting was performed using commercial anti-EGF antibodies (ab155576, Abcam, US) as the primary antibody and the corresponding goat anti-mouse H&L IgG (HRP) (ab205719, Abcam, US) as the secondary antibody according to the operation procedures described in the kit instructions. Immunoreactive protein hybridization signals were detected by the Clinx chemiluminescent imaging system (Chemicope 5300, Shanghai, China) using ECL+Western Blot assay (Beyotime, Jiangsu, China) according to the manufacturer's instructions. The intensity of the F-POI (EGF) protein hybridization signal was calculated using Image-J software, and the results of three independent experiments were taken and conducted for error analysis (the results were expressed as mean±standard deviation). The results were as shown in FIG. 2 D, Table 2 and Table 3. Compared with the wild-type (WT) cocoon silk sample, specific F-POI (EGF) proteins with different molecular weights were detected in NEC and $N_sEC_s$ cocoon silk protein samples (FIG. 2D). Through comparison with protein Marker, it was found that the actual molecular weight of the F-POI (EGF) protein in NEC cocoon silk protein sample (about 36 kDa) was greater than its theoretical molecular weight (25.9 kDa), while the actual molecular weight of the F-POI (EGF) protein in $N_sEC_s$ cocoon silk protein sample (about 9 kDa) was similar to its theoretical molecular weight (8.5 kDa) (Table 2). By analyzing the Western blotting hybrid bands by Image-J software, the results showed that the proportions of the two F-POI (EGF) proteins in the total unregummed NEC and NECs cocoon shell proteins were 14.28±1.09% and 2.75±0.51%, respectively; and after the degumming treatment, the proportions of the two F-POI (EGF) proteins in NEC and $N_sEC_s$ silk fibroin protein solutions were 7.13±1.79% and 1.16±0.23%, respectively (Table 3). Summing up the above research results, it shows that the actual molecular weight of the F-POI (EGF) protein in the $N_sEC_s$ cocoon silk could can be consistent with and the theoretical molecular weight by using the truncated N-terminal domain and the C-terminal domain expressed by the novel silk gland expression system disclosed by the present disclosure, that is, additional post-translational modification of the F-POI (EGF) protein could also be avoided. In addition, the loss rates of the two F-POI (EGF) proteins in the degumming process were both 50%, indicating that the truncated N-terminal domain and C-terminal domain were consistent with the traditional full-length N-terminal domain and C-terminal domain in affecting the degumming loss of the F-POI (EGF) protein. The truncated N-terminal domain and C-terminal domain did not lead to an increase in the loss rate of the F-POI (EGF) protein degumming. (Table 2: Theoretical and actual molecular weight statistics of the two different F-POI (EGF) proteins contained in the transgenic cocoon silk and the EGF standard; Table 3: The percentage of two different F-POI (EGF) proteins contained in transgenic cocoon silk in the total protein mass of cocoon silk before and after degumming treatment)

TABLE 2

| F-POI or standard | Theoretical (kDa) | Actual (kDa) |
| --- | --- | --- |
| NEC | 25.9 | ~36 |
| $N_sEC_s$ | 8.5 | ~9 |
| EGF standard | 6.2 | ~6 |

TABLE 3

| F-POI | Cocoon (%) | Solution (%) |
| --- | --- | --- |
| NEC | 14.28 ± 1.09 | 7.13 ± 1.79 |
| $N_sEC_s$ | 2.75 ± 0.51 | 1.16 ± 0.23 |

Example 4

Figure 3:
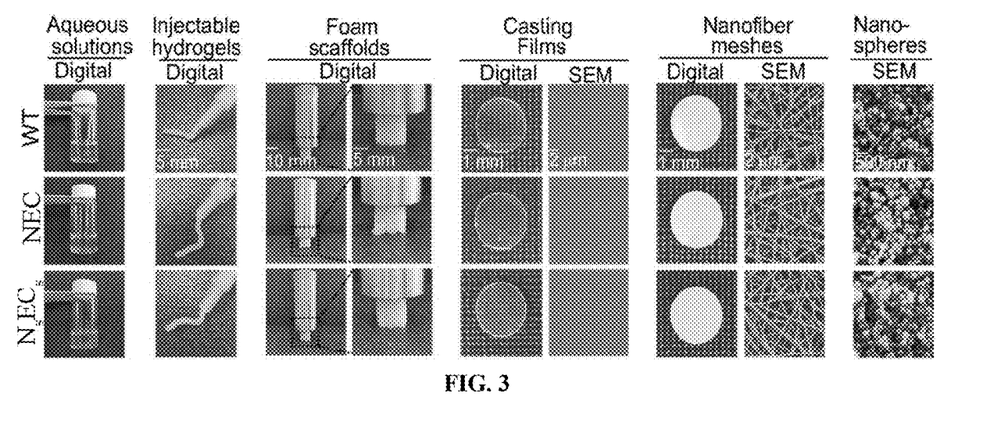
FIG. 3 shows digital photographs and scanning electron microscope photographs of different types of silk fibroin-based biological materials (injectable hydrogels, foam scaffolds, silk fibroin films, nanowires and nanospheres) prepared by using wild-type silk fibroin and two regenerated aqueous solutions of transgenic silk fibroin containing different F-POI (EGF) proteins.

Preparation of Different Types of Functional Silk Fibroin-Based Biological Materials Using F-POI (EGF) Protein Cocoon Silk Injectable Hydrogels, Foam Scaffolds, Silk Fibroin Films, Nanowires and Nanospheres Using the NEC and NECs silk fibroin protein aqueous solutions respectively containing two different F-POI (EGF) proteins obtained in Example 3 as raw materials, a transgenic silk fibroin-based injectable hydrogel, foam scaffold, silk fibroin film, nanowire and nanosphere (FIG. 3) were prepared according to the processing method of the conventional silk fibroin-based biological material, thereby confirming that the two SF/F-POI (EGF) mixed aqueous solutions obtained by the present disclosure could be used for preparing various biological materials similar to the conventional natural silk fibroin-based tissue engineering applications. The specific preparation steps were as follows:

Injectable hydrogels were prepared by an ultrasonic method: i) a NEC (or $N_sEC_s$) silk fibroin solution was diluted with deionized water to a concentration of 20 mg/mL; ii) the silk fibroin solution was ultrasonically treated by an ultrasonic instrument at an amplitude of 20% for 60 s, and paused for 1 s every 1 s of ultrasound; iii) The ultrasonic silk fibroin solution was injected into a syringe and placed at 4° C. overnight to obtain NEC (or $N_sEC_s$) silk fibroin-based injectable hydrogel.

Foam scaffolds were prepared by casting: i) a NEC (or $N_sEC_s$) silk fibroin solution was diluted with deionized water to a concentration of 20 mg/mL and transferred to a plastic culture dish; ii) the culture dish was placed in a refrigerating chamber to cool the silk fibroin solution to 4° C., and then the culture dish was transferred to a −20° C. refrigerator and left overnight; iii) the culture dish was subsequently transferred to a refrigerator at the temperature of −80° C. for further storage for 24 h; iv) then the silk fibroin was freeze-dried, the freeze dried silk fibroin was annealed overnight at room temperature with water vapor; and v) finally, the obtained silk fibroin foam scaffolds were cut into cubes.

Silk fibroin films were prepared by film casting: i) a NEC (or $N_sEC_s$) silk fibroin solution was diluted with deionized water to a concentration of 20 mg/mL and cast on a plastic culture dish; ii) the silk fibroin solution was annealed overnight at room temperature with water vapor after naturally air-drying; and iii) finally, the obtained silk fibroin films were punched into disc shape by using a hole punch.

The nanofiber mesh was prepared by an electrospinning method: i) polyethylene oxide and NEC (or $N_sEC_s$) silk fibroin solution (concentration: 75 mg/mL) were mixed and dissolved in a mass ratio of 0.3:1; ii) the mixed solutions was electrospinned using an electrostatic spinning machine (flow rate of 20 µL/min, voltage of 20 to 25 kV, distance of 20 cm); iii) the nanofiber meshes were annealed overnight at room temperature with water vapor after electrospinning.

The nanospheres were prepared by acetone precipitation method: i) a NEC (or $N_sEC_s$) silk fibroin solution was diluted with deionized water to a concentration of 40 mg/mL, and then dropwise added into an acetone solution to make the silk fibroin form nanospheres and separate out. ii) the nanospheres were washed with deionized water, and centrifuged at 5000 rpm for 1 h. The nanospheres were collected three times in total.

The cell growth promoting activities of transgenic silk fibroin-based biological materials containing two different F-POI (EGF) proteins were further compared. The biological activities of two different F-POI (EGF) proteins in silk fibroin films were detected by using mouse fibroblast NIH/3T3 cells. Two kinds of F-POI (EGF) proteins solutions extracted from the silk fibroin films of the NEC and $N_sEC_s$ groups and a commercial EGF standard (AF-100-15, Pepro-Tech, US) solution (as the positive control group) were diluted to a concentration of 0.25 nM (0.25 nM was the optimal stimulation concentration of the experimentally identified EGF protein on NIH/3T3 cells) and the NIH/3T3 cells were treated with the diluted solution. Since the diluted wild-type (WT) silk fibroin film extract had no significant effect on cell proliferation, a cell culture medium free of EGF was used as the negative control group.

Figure 4A:
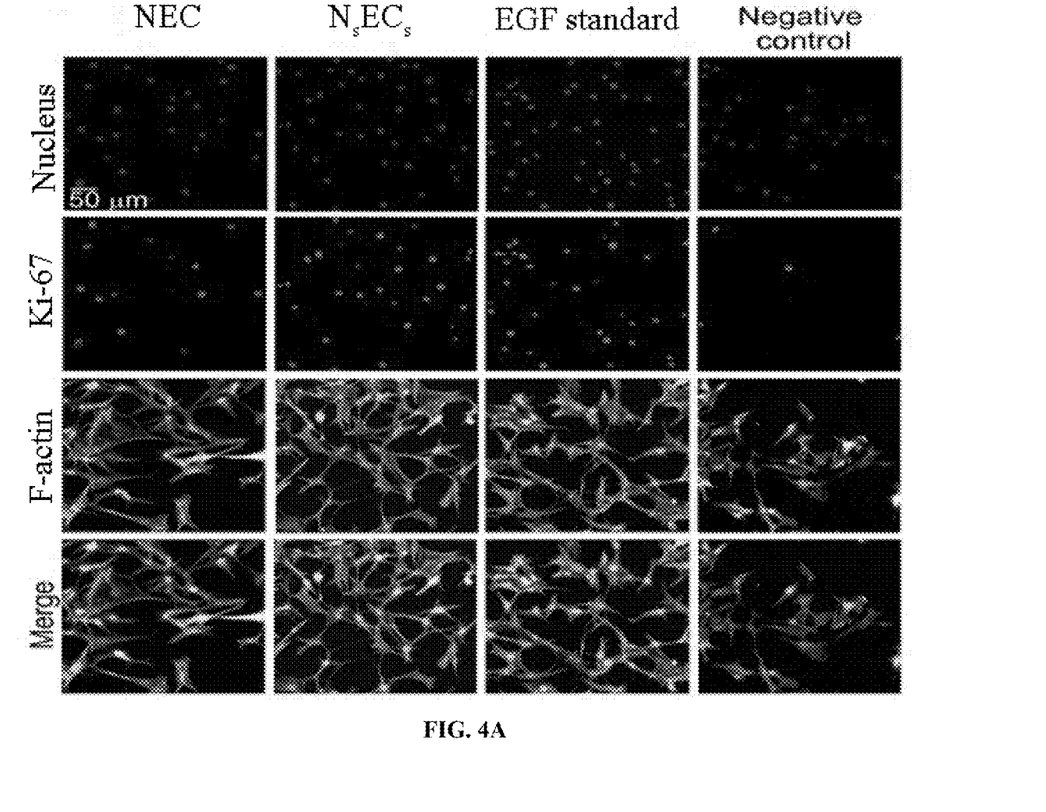
FIG. 4A: Immunofluorescence images of nucleus, the Ki-67 protein and F-actin after NIH/3T3 cells were treated with different F-POI (EGF) extracted from the transgenic silk fibroin film for 24 h, respectively.
Figure 4B:
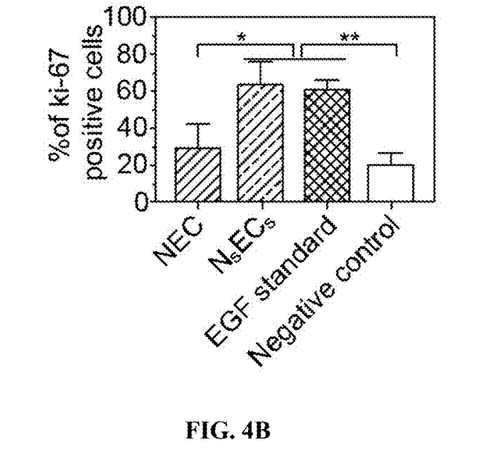
FIG. 4B: Cell proliferation state after 24 h of growth detected by Ki-67 staining.
Figure 4C:
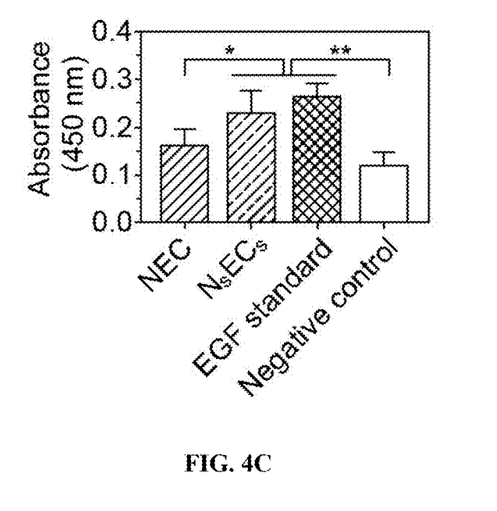
FIG. 4C: Cell metabolic activity after 72 h growth detected by using a CCK-8 kit.

The metabolic activity of cells was determined by detecting the protein content of Ki-67, a proliferation marker related to ribosomal RNA transcription, in different treatment groups. The results were as shown in FIG. 4A, FIG. 4B and FIG. 4C. After treatment for 24 h, the percentages of positive proliferating cells containing Ki-67 in $N_sEC_s$ and positive control group were significantly higher than those in NEC group (P<0.05) and negative control group (P<0.01) (FIG. 4A and FIG. 4B). From the experimental results, it could be shown that compared with the traditional F-POI (EGF) protein, the F-POI (EGF) protein containing the truncated N-terminal domain and the C-terminal domain had biological activity for promoting cell proliferation comparable to that of the commercially available EGF standard. After 72 h of treatment, the detection result of Ki-67 protein was confirmed by CCK-8 detection. Compared with the traditional F-POI (EGF) protein, the F-POI (EGF) protein containing the truncated N-terminal domain and C-terminal domain and the commercially available EGF standard treatment group significantly improved the metabolic activity of the cells (P<0.05) (FIG. 4C).

Figure 4D:
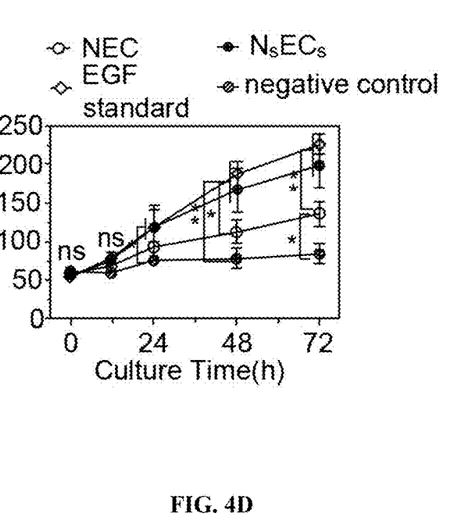
FIG. 4D: Cell proliferation rate within 72 h of growth detected by QuantiFluor dsDNA kit.

In addition, cell proliferative activity was quantified by measuring the DNA content of cells from different treatment groups. The results were as shown in FIG. 4 D. Within the first 12 h, the cell proliferation situations of the four experimental groups were similar. After 24 h, the numbers of cells in the positive control group and the $N_sEC_s$ group were significantly higher than that in the negative control group (P<0.05), and the difference became larger with the culture time prolonging. After 72 h, the cell proliferation rates in the positive control group and the $N_sEC_s$ group were significantly higher than that in the NEC group (P<0.01), while the number of cells in the NEC group was significantly higher than that in the negative control group (P<0.05). In summary, the biological activity of the F-POI (EGF) protein containing the full-length N-terminal domain and the C-terminal domain expressed by the traditional silk gland expression system is obviously lower than that of the F-POI (EGF) protein containing the truncated N-terminal domain and the C-terminal domain expressed by the novel silk gland expression system disclosed by the present disclosure. In addition, the biological activity of F-POI (EGF) containing the truncated N-terminal domain and the C-terminal domain was even comparable to that of commercially available EGF standard.

Example 5

Figure 5A:
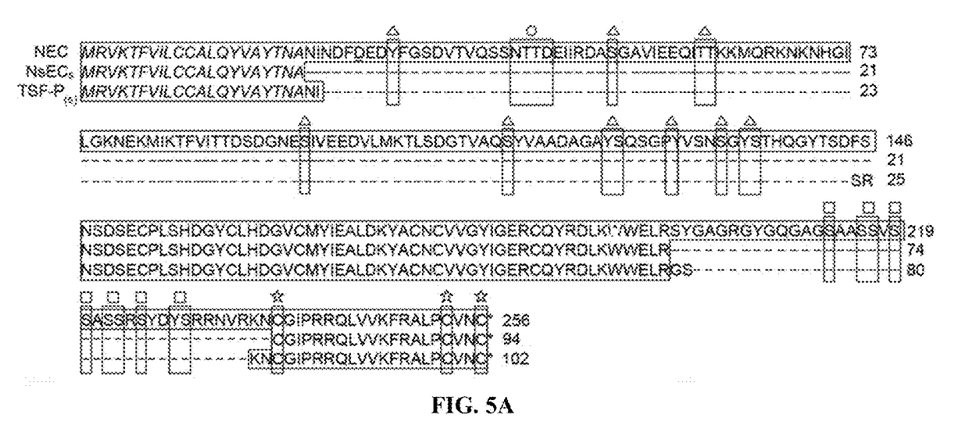
Figure 5B:
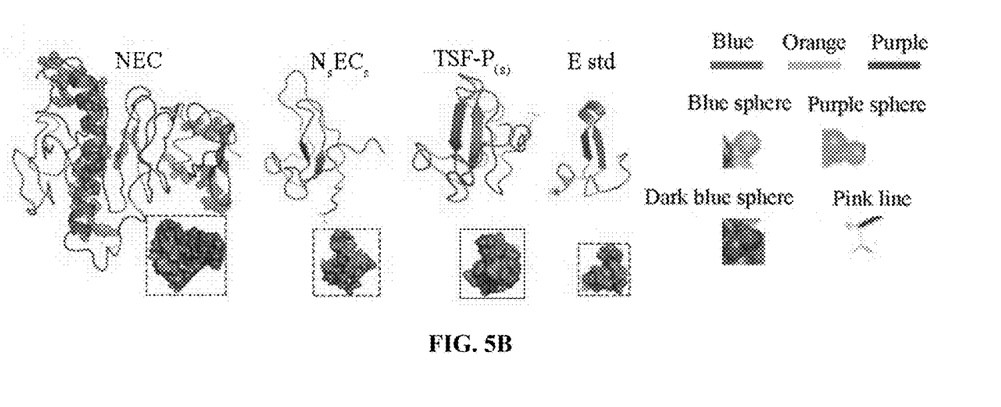
FIG. 5B: Structural models of two F-POI (EGF) proteins, TSF-$P_{(s)}$ and the natural EGF protein, wherein purple, orange and blue respectively represent an N-terminal domain of the SF-h protein, a structural fragment of the natural EGF protein and a C-terminal domain (or a truncated C-terminal domain) of the SF-h protein; the blue and purple spheres respectively represent predicted phosphorylation sites on the N-terminal and C-terminal domains; the dark blue sphere indicates predicted glycosylation sites on the N-terminal domain; the pink line indicates the cysteine residue of the C-terminal domain (or the truncated C-terminal domain), and the corresponding surface model is shown with a black dotted box.

Comparison of Structural Similarities Between Different Recombinant Fused Human Epidermal Growth Factor Proteins and the Natural EGF Protein Using the 3D Modeling Method In a paper entitled "Creation and research of novel silk material with hEGF bioactivity", a recombinant epidermal growth factor active protein expressed in silk named TSF-$P_{(s)}$ was disclosed (Lu Weijian. Creation and research of novel silk material with hEGF bioactivity. Dissertation for Master's Degree of Southwest University, 2015). Compared with the POI (EGF) protein sequence of $N_sEC_s$ group in Example 1, the amino acid sequence of the disclosed EGF protein has 4 more amino acids upstream and 4 more amino acids downstream (FIG. 5A). From the perspective of biological research, it is recognized that the activity or function of a protein is determined by its three-dimensional structure. In order to evaluate the structural similarity between the two F-POI (EGF) proteins, the TSF-$P_{(s)}$ protein and the natural EGF protein, the 3D structural models of the two F-POI (EGF) proteins, the TSF-$P_{(s)}$ protein and the natural EGF protein were constructed using DMPfold (http://bioinf.cs.ucl.ac.uk/psipred/) for de novo modeling of proteins. As shown in the structural model of FIG. 5B, the F-POI (EGF) protein from the NECs group, the TSF-$P_{(s)}$ protein and the natural EGF protein had similar center-aligned β-sheet structures, while F-POI (EGF) from the NEC group did not have this center-aligned structure. As shown in Table 4, the C-alpha RMSD values (3.173 Å) between the F-POI (EGF) protein in the $N_sEC_s$ group and the native EGF protein were much smaller than the C-alpha RMSD values (11.200 Å and 9.413 Å, respectively) between the F-POI (EGF) or TSF-$P_{(s)}$ protein and the native EGF protein in the NEC group. In addition, the TM-score of the predicted structure of the F-POI (EGF) protein in the $N_sEC_s$ group relative to the natural EGF protein was 0.413, much higher than the TM-score (0.066) of the predicted structure of the F-POI (EGF) protein in the NEC group relative to the natural EGF protein, and much higher than the TM-score (0.125) of the predicted structure of the TSF-$P_{(s)}$ protein relative to the natural EGF protein. Among them, the TM-score range of 0-0.1747 indicated the randomness or dissimilarity between the two protein structures. In conclusion, the data from the 3D structural model of the protein indicated that, compared with the other two recombinant EGF proteins, the F-POI (EGF) protein with the redundant post-translational modification sites removed from the $N_sEC_s$ group had the highest structural similarity with the natural EGF protein, thereby effectively enhancing the biological activity of expressing the F-POI (EGF) protein in the cocoon silk material from the $N_sEC_s$ group. (Table 4: Root mean square deviation (RMSD) and TM-score of C-alpha atoms between different F-POI (EGF) and TSF-$P_{(s)}$ protein models and natural EGF protein models)

TABLE 4

| Protein models | RMSD (Å) | TM-score |
|---|---|---|
| NEC | 11.200 | 0.066 |
| $N_sEC_s$ | 3.173 | 0.413 |
| TSF-$P_{(s)}$ | 9.413 | 0.125 |

Finally, the above examples are only for illustrating the technical scheme of the present disclosure and are not limiting. Although the technical scheme of the present disclosure has been described in detail with reference to the preferred embodiments, it should be understood by those skilled in the art that, without departing from the spirit and scope of the present disclosure, several modifications or equivalent substitutions can be made, and these modifications and equivalent substitutions should also fall within the scope of the claims of the present disclosure.

What is claimed is:

1. A silk gland recombinant expression vector of silkworm expressing human epidermal growth factor, wherein the silk gland recombinant expression vector of silkworm comprises a vector skeleton and a target gene expression frame, wherein the target gene expression frame comprises an optimized human epidermal growth factor gene sequence (EGF) and a silkworm nuclear polyhedrosis virus enhancer (hr3) sequence, and wherein the nucleotide sequences of the optimized human epidermal growth factor gene sequence and the silkworm nuclear polyhedrosis virus enhancer sequence are set forth in SEQ ID NO:3 and SEQ ID NO:1, respectively.

2. The silk gland recombinant expression vector of silkworm according to claim 1, wherein the target gene expression frame further comprises a sequence-optimized truncated promoter (FHP3$_s$) sequence encoding amino acids at positions 1-21 of the N-terminal domain of SF-h protein, and wherein the nucleotide sequence of the sequence-optimized truncated promoter sequence is set forth in SEQ ID NO:2.

3. The silk gland recombinant expression vector of silkworm according to claim 1, wherein the target gene expression frame further comprises a truncated SF-h gene light chain binding site (LBS$_s$) sequence encoding amino acids at positions 1-20 of the C-terminal domain of the SF-h protein, and wherein the nucleotide sequence of the truncated SF-h gene light chain binding site sequence is set forth in SEQ ID NO:5.

4. The silk gland recombinant expression vector of silkworm according to claim 3, wherein the vector skeleton is pBac{3×P3-DsRed}.

5. A method for preparing the silk gland recombinant expression vector of silkworm according to claim 4, comprising: sequentially connecting hr3, FHP3$_s$, EGF and LBS$_s$ to a pUC57-T-simple vector to obtain a recombinant vector PUC-hr3-FHP3$_s$-EGF-LBS$_s$ containing an hr3-FHP3$_s$-EGF-LBS$_s$, expression frame; double-enzyme-cleaving the recombinant vector with AscI/FseI, recovering an hr3-FHP3$_s$-EGF-LBS$_s$ expression frame fragment, and connecting the fragment to a pBac{3×P3-DsRed} vector skeleton double-enzyme-cleaved by AscI/FseI to obtain a silkworm silk gland recombinant expression vector pBac {3×P3-DsRed; FHP3-EGF-LBS}.

6. An exogenous fibroin, wherein the exogenous fibroin is expressed by the silk gland recombinant expression vector of silkworm of claim 1.

7. A silk material based on silk fibroin comprising an exogenous fibroin according to claim 6.

8. The silk material according to claim 7, comprising an additional component selected from the group consisting of a transgenic silk fibroin-based injectable hydrogel, a foam scaffold, a silk fibroin film, nanowires, and nanospheres.

9. The exogenous fibroin according to claim 6, wherein the exogenous fibroin is capable of preparing a silk material based on silk fibroin.

10. The exogenous fibroin according to claim 9, wherein the silk material is a transgenic silk fibroin-based injectable hydrogel, a foam scaffold, a silk fibroin film, nanowires and nanospheres.

11. The silk gland recombinant expression vector of silkworm according to claim 2, wherein the target gene expression frame further comprises a truncated SF-h gene light chain binding site (LBS$_s$) sequence encoding amino acids at positions 1-20 of the C-terminal domain of SF-h protein, and the nucleotide sequence of LBS$_s$, is set forth in SEQ ID NO:5.

12. The silk gland recombinant expression vector of silkworm according to claim 11, wherein the vector skeleton is pBac{3×P3-DsRed}.

* * * * *

SEQUENCE LISTING

```
<160> NUMBER OF SEQ ID NOS: 8

<210> SEQ ID NO 1
<211> LENGTH: 949
<212> TYPE: DNA
<213> ORGANISM: Artificial Sequence
<220> FEATURE:
<223> OTHER INFORMATION: nucleotide sequence of hr3

<400> SEQUENCE: 1
cagcgtcgtg aaaagaggca atgacaaata caaaacgacg tatgagcaga cccgtcgcca      60
agacgggtct acctctaaga tgatgtcatt tgttttttaa aactaactcg ctttacgagt     120
agaattctac gtgtaaaaca taatcaagag atgatgtcat ttgtttttca aaaccaaact     180
cgctttacga gtagaattct acgtgtaaaa cacaatcaaa agatgatgtc attcgttttt     240
caaaaccgaa tttaagaaat gatgtcattt gtttttcaaa accaaactcg ctttacgagc     300
agaattctac gtgtaaaaca caatcaagag atgatgtcat ttgtttttca aaactgaatg     360
atgtcatttg tttttcaaaa ctaaacttgc tttgcgagta gaattctacg tgtaaaacac     420
agtcaagaga tgatgtcatt tgtttttcaa aactgaaccg gctttacgag tagaattcta     480
cttgtaaaac ataatcaaga gatgatgtca tttgtttttc aaaactgaac tggctttacg     540
agtagaattc tacgtgtaaa acataatcaa gagatgatgt catcattaaa ctgatgtcat     600
tttatacacg attgttaaca tgtttaataa tgactaattt gtttttccaa attaaactcg     660
ctttacgagt agaattctac ttgtaacgca cgattaagta tgaatcataa gctgatgtca     720
tttgttttcg acataaaatg tttatacaat ggaatcttct tgtaaattat ccaaataata     780
taatttatcc gattctacgt tacatttaaa ttcgttgtta tcgtacaatt cttcaggaca     840
cgccatgtat tggtcatttt tagcgtgcaa ccaacgattg tatttgacgc cgtcgttgga     900
ttgcgtgttc aggttggcgt acacgtgact gggcacggct tctttttcc                 949

<210> SEQ ID NO 2
```

<211> LENGTH: 1929
<212> TYPE: DNA
<213> ORGANISM: Artificial Sequence
<220> FEATURE:
<223> OTHER INFORMATION: nucleotide sequence of FHP3s

<400> SEQUENCE: 2

```
aagcttgttg tacaaaactg ccacacgcat ttttttctcc actgtaggtt gtagttacgc      60
gaaaacaaaa tcgttctgtg aaaattcaaa caaaaatatt ttttcgtaaa aacacttatc     120
aatgagtaaa gtaacaattc atgaataatt tcatgtaaaa aaaaaatact agaaaaggaa     180
tttttcatta cgagatgctt aaaaatctgt ttcaaggtag agattttcg atatttcgga      240
aaattttgta aaactgtaaa tccgtaaaat tttgctaaac atatattgtg ttgttttggt     300
aagtattgac ccaagctatc acctcctgca gtatgtcgtg ctaattactg gacacattgt     360
ataacagttc cactgtattg acaataataa aacctcttca ttgacttgag aatgtctgga     420
cagatttggc tttgtatttt tgatttacaa atgttttttt ggtgatttac ccatccaagg     480
cattctccag gatggttgtg gcatcacgcc gattggcaaa caaaaactaa aatgaaacta     540
aaaagaaaca gtttccgctg tcccgttcct ctagtgggag aaagcatgaa gtaagttctt     600
taaatattac aaaaaaattg aacgatatta taaaattctt taaaatatta aaagtaagaa     660
caataagatc aattaaatca taattaatca cattgttcat gatcacaatt taatttactt     720
catacgttgt attgttatgt taaataaaaa gattaatttc tatgtaattg tatctgtaca     780
atacaatgtg tagatgttta ttctatcgaa agtaaatacg tcaaaactcg aaaattttca     840
gtataaaaag gttcaacttt ttcaaatcag catcagttcg gttccaactc tcaagatgag     900
agtcaaaacc tttgtgatct tgtgctgcgc tctgcaggtg agttaattat tttactatta     960
tttcagaagg tggccagacg atatcacggg ccacctgata taagtggtc gccaaaacgc     1020
acagatatcg taaattgtgc catttgattt gtcacgcccg gggggctac ggaataaact     1080
acatttatt atttaaaaaa tgaaccttag attatgtaac ttgtgatttta tttgcgtcaa     1140
aagtaggcaa gatgaatcta tgtaaatacc tgggcagact tgcaatatcc tatttcaccg     1200
gtaaatcagc attgcaatat gcaatgcata ttcaacaata tgtaaaacaa ttcgtaaagc     1260
atcattagaa aatagacgaa agaaattgca taaaattata accgcattat taatttatta     1320
tgatatctat taacaattgc tattgccttt ttttcgcaaa ttataatcat tttcataacc     1380
tcgaggtagc attctgttac atttttaatac attggtatgt gattataaca cgagctgccc     1440
actgagtttc tcgccagatc ttctcagtgg gtcgcgttac cgatcacgtg atagattcta     1500
tgaagcactg ctcttgttag ggctagtgtt agcaaattct ttcaggttga gtctgagagc     1560
tcacctaccc atcggagcgt agctggaata ggctaccagc taataggtag ggaaaacaaa     1620
gctcgaaaca agctcaagta ataacaacat aatgtgacca taaaatctcg tggtgtatga     1680
gatacaatta tgtactttcc cacaaatgtt tacataatta gaatgttgtt caacttgcct     1740
aacgccccag ctagaacatt caattattac tattaccact actaaggcag tatgtcctaa     1800
ctcgttccag atcagcgcta acttcgattg aatgtgcgaa atttatagct caatatttta     1860
gcacttatcg tattgattta agaaaaaatt gttaacattt tgtttcagta tgtcgcttat     1920
acaaatgca                                                            1929
```

<210> SEQ ID NO 3
<211> LENGTH: 159
<212> TYPE: DNA
<213> ORGANISM: Artificial Sequence
<220> FEATURE:
<223> OTHER INFORMATION: nucleotide sequence of EGF

<400> SEQUENCE: 3

```
aactcggaca gcgaatgccc cctctcccac gacggctatt gcctccacga tggtgtgtgt    60
atgtatattg aagctcttga taagtatgct tgcaactgtg ttgtgggcta catcggcgag   120
cgttgccaat acagggacct caagtggtgg gaactccgt                           159
```

<210> SEQ ID NO 4
<211> LENGTH: 53
<212> TYPE: PRT
<213> ORGANISM: Artificial Sequence
<220> FEATURE:
<223> OTHER INFORMATION: amino acid sequence of EGF

<400> SEQUENCE: 4

```
Asn Ser Asp Ser Glu Cys Pro Leu Ser His Asp Gly Tyr Cys Leu His
1               5                   10                  15

Asp Gly Val Cys Met Tyr Ile Glu Ala Leu Asp Lys Tyr Ala Cys Asn
            20                  25                  30

Cys Val Val Gly Tyr Ile Gly Glu Arg Cys Gln Tyr Arg Asp Leu Lys
        35                  40                  45

Trp Trp Glu Leu Arg
    50
```

<210> SEQ ID NO 5
<211> LENGTH: 222
<212> TYPE: DNA
<213> ORGANISM: Artificial Sequence
<220> FEATURE:
<223> OTHER INFORMATION: nucleotide sequence of LBSs

<400> SEQUENCE: 5

```
tgtggaattc ctagaagaca actagttgtt aaattcagag cactgccttg tgtgaattgc    60
taattttaa tataaaataa cccttgtttc ttacttcgtc ctggatacat ctatgttttt   120
tttttcgtta ataaatgaga gcatttaagt tattgttttt aattactttt ttttagaaaa   180
cagatttcgg attttttgta tgcattttat ttgaatgtac ta                      222
```

<210> SEQ ID NO 6
<211> LENGTH: 256
<212> TYPE: PRT
<213> ORGANISM: Artificial Sequence
<220> FEATURE:
<223> OTHER INFORMATION: amino acid sequence of NEC

<400> SEQUENCE: 6

```
Met Arg Val Lys Thr Phe Val Ile Leu Cys Cys Ala Leu Gln Tyr Val
1               5                   10                  15

Ala Tyr Thr Asn Ala Asn Ile Asn Asp Phe Asp Glu Asp Tyr Phe Gly
            20                  25                  30

Ser Asp Val Thr Val Gln Ser Ser Asn Thr Thr Asp Glu Ile Ile Arg
        35                  40                  45

Asp Ala Ser Gly Ala Val Ile Glu Glu Gln Ile Thr Thr Lys Lys Met
    50                  55                  60

Gln Arg Lys Asn Lys Asn His Gly Ile Leu Gly Lys Asn Glu Lys Met
65                  70                  75                  80

Ile Lys Thr Phe Val Ile Thr Thr Asp Ser Asp Gly Asn Glu Ser Ile
                85                  90                  95
```

```
Val Glu Glu Asp Val Leu Met Lys Thr Leu Ser Asp Gly Thr Val Ala
            100                 105                 110

Gln Ser Tyr Val Ala Ala Asp Ala Gly Ala Tyr Ser Gln Ser Gly Pro
        115                 120                 125

Tyr Val Ser Asn Ser Gly Tyr Ser Thr His Gln Gly Tyr Thr Ser Asp
    130                 135                 140

Phe Ser Asn Ser Asp Ser Glu Cys Pro Leu Ser His Asp Gly Tyr Cys
145                 150                 155                 160

Leu His Asp Gly Val Cys Met Tyr Ile Glu Ala Leu Asp Lys Tyr Ala
                165                 170                 175

Cys Asn Cys Val Val Gly Tyr Ile Gly Glu Arg Cys Gln Tyr Arg Asp
            180                 185                 190

Leu Lys Trp Trp Glu Leu Arg Ser Tyr Gly Ala Gly Arg Gly Tyr Gly
        195                 200                 205

Gln Gly Ala Gly Ser Ala Ala Ser Ser Val Ser Ser Ala Ser Ser Arg
    210                 215                 220

Ser Tyr Asp Tyr Ser Arg Arg Asn Val Arg Lys Asn Cys Gly Ile Pro
225                 230                 235                 240

Arg Arg Gln Leu Val Val Lys Phe Arg Ala Leu Pro Cys Val Asn Cys
                245                 250                 255

<210> SEQ ID NO 7
<211> LENGTH: 94
<212> TYPE: PRT
<213> ORGANISM: Artificial Sequence
<220> FEATURE:
<223> OTHER INFORMATION: amino acid sequence of NsECs

<400> SEQUENCE: 7

Met Arg Val Lys Thr Phe Val Ile Leu Cys Cys Ala Leu Gln Tyr Val
1               5                   10                  15

Ala Tyr Thr Asn Ala Asn Ser Asp Ser Glu Cys Pro Leu Ser His Asp
            20                  25                  30

Gly Tyr Cys Leu His Asp Gly Val Cys Met Tyr Ile Glu Ala Leu Asp
        35                  40                  45

Lys Tyr Ala Cys Asn Cys Val Val Gly Tyr Ile Gly Glu Arg Cys Gln
    50                  55                  60

Tyr Arg Asp Leu Lys Trp Trp Glu Leu Arg Cys Gly Ile Pro Arg Arg
65                  70                  75                  80

Gln Leu Val Val Lys Phe Arg Ala Leu Pro Cys Val Asn Cys
                85                  90

<210> SEQ ID NO 8
<211> LENGTH: 102
<212> TYPE: PRT
<213> ORGANISM: Artificial Sequence
<220> FEATURE:
<223> OTHER INFORMATION: amino acid sequence of TSF-P(s)

<400> SEQUENCE: 8

Met Arg Val Lys Thr Phe Val Ile Leu Cys Cys Ala Leu Gln Tyr Val
1               5                   10                  15

Ala Tyr Thr Asn Ala Asn Ile Ser Arg Asn Ser Asp Ser Glu Cys Pro
            20                  25                  30

Leu Ser His Asp Gly Tyr Cys Leu His Asp Gly Val Cys Met Tyr Ile
        35                  40                  45

Glu Ala Leu Asp Lys Tyr Ala Cys Asn Cys Val Val Gly Tyr Ile Gly
    50                  55                  60
```

```
Glu Arg Cys Gln Tyr Arg Asp Leu Lys Trp Trp Glu Leu Arg Gly Ser
65                  70                  75                  80

Lys Asn Cys Gly Ile Pro Arg Arg Gln Leu Val Val Lys Phe Arg Ala
                85                  90                  95

Leu Pro Cys Val Asn Cys
                100
```